United States Patent
Klug et al.

(10) Patent No.: US 6,894,007 B2
(45) Date of Patent: May 17, 2005

(54) ADDITIVES FOR INHIBITING GAS HYDRATE FORMATION

(75) Inventors: Peter Klug, Grossostheim (DE); Uwe Dahlmann, Heidelberg (DE); Michael Feustel, Köngernheim (DE)

(73) Assignee: Clariant GmbH, Frankfurt (DE)

(*) Notice: Subject to any disclaimer, the term of this patent is extended or adjusted under 35 U.S.C. 154(b) by 486 days.

(21) Appl. No.: 10/102,584

(22) Filed: Mar. 20, 2002

(65) Prior Publication Data

US 2003/0013614 A1 Jan. 16, 2003

(30) Foreign Application Priority Data

Mar. 24, 2001 (DE) .......................... 101 14 638

(51) Int. Cl.$^7$ ........................... C09K 3/00; E21B 43/28
(52) U.S. Cl. ..................... 507/90; 507/246; 507/221; 507/224; 507/225; 507/229; 585/15; 585/950
(58) Field of Search ................. 507/90, 246, 221, 507/224, 225, 229; 585/15, 950

(56) References Cited

U.S. PATENT DOCUMENTS

| | | | |
|---|---|---|---|
| 6,152,993 A | 11/2000 | Klomp | ............... 95/153 |
| 6,566,309 B1 | 5/2003 | Klug et al. | ............... 507/90 |

FOREIGN PATENT DOCUMENTS

| | | |
|---|---|---|
| DE | 199 20 152 | 10/2000 |
| EP | 1 050 567 | 4/2000 |
| GB | 2 349 889 | 11/2000 |
| WO | 94/12761 | 6/1994 |
| WO | WO 96/08456 | 3/1996 |
| WO | 96/08672 | 3/1996 |
| WO | 96/41785 | 12/1996 |
| WO | 97/06506 | 2/1997 |

*Primary Examiner*—Philip C. Tucker
(74) *Attorney, Agent, or Firm*—Richard P. Silverman

(57) ABSTRACT

The invention relates to the use of compounds of the formula (1)

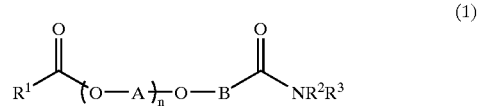

(1)

in which $R^1$ is $C_1$- to $C_{24}$-alkyl, $C_2$- to $C_{24}$-alkenyl or a $C_6$- to $C_{18}$-aryl radical which may be substituted by a $C_1$- to $C_{24}$-alkyl group, $R^2$, $R^3$ independently of one another, are hydrogen, $C_1$- to $C_{18}$-alkyl, or $C_5$- to $C_7$-cycloalkyl, or $R^2$ and $R^3$, including the nitrogen atom to which they are bonded, form a ring of 4 to 8 ring atoms, in which oxygen or nitrogen atoms may also be present in addition to carbon.

A are identical or different $C_2$- to $C_4$-alkylene radicals,

B is $C_1$- to $C_7$-alkylene, and n is an integer from 1–40, as gas hydrate inhibitors.

9 Claims, No Drawings

ADDITIVES FOR INHIBITING GAS HYDRATE FORMATION

BACKGROUND OF THE INVENTION

The present invention relates to an additive and a process for inhibiting nucleation, growth and/or agglomeration of gas hydrates by adding an effective amount of an inhibitor which contains esters of alkoxylated hydroxycarboxylic acid amides to a multiphase mixture tending to hydrate formation and comprising water, gas and possibly condensate or to a drilling fluid tending to gas hydrate formation.

Gas hydrates are crystalline clathrate compounds of gas molecules in water, which form under specific temperature and pressure conditions (low temperature and high pressure). The water molecules form cage structures around the corresponding gas molecules. The framework formed from the water molecules is thermodynamically unstable and is stabilized only by the inclusion of gas molecules. Depending on pressure and gas composition, these ice-like compounds can also exist above the freezing point of water (up to more than 25° C.).

In the petroleum and natural gas industry, in particular the gas hydrates which form from water and the natural gas components methane, ethane, propane, isobutane, n-butane, nitrogen, carbon dioxide and hydrogen sulfide are of considerable importance. Particularly in present day natural gas production, the existence of these gas hydrates presents a major problem especially when wet gas or multiphase mixtures comprising water, gas and alkane mixtures under high pressure are exposed to low temperatures. Here, owing to their insolubility and crystalline structure, the formation of gas hydrates leads to blockage of a very wide range of transport means, such as pipelines, valves or production systems in which wet gas or multiphase mixtures are transported over long distances at low temperatures, as occurs in particular in colder regions of the world or on the seabed.

In addition, gas hydrate formation can lead to problems also in the drilling process for developing new gas or petroleum deposits under corresponding and temperature conditions by virtue of the fact that gas hydrates form in the drilling fluids.

To avoid such problems, the gas hydrate formation in gas pipelines, during transport of multiphase mixtures or in drilling fluids can be suppressed by using relatively large amounts (more than 10% by weight, based on the weight of the aqueous phase) of lower alcohols, such as methanol, glycol or diethylene glycol. The addition of these additives of these additives shifts the thermodynamic limit of gas hydrate formation to lower temperatures and higher pressures (thermodynamic inhibition). However, the addition of these thermodynamic inhibitors gives rise to greater safety problems (flash point and toxicity of the alcohols), logistic problems (greater storage tanks, recycling of these solvents) and accordingly high costs, especially in offshore production.

Today, attempts are therefore being made to replace thermodynamic inhibitors by adding, at temperature and pressure ranges in which gas hydrates can form, additives in amounts of <2% which either delay the gas hydrate formation (kinetic inhibitors) or keep the gas hydrate agglomerates small and therefore pumpable so that they can be transported through the pipeline (so-called agglomerate inhibitors or anti-agglomerates). The inhibitors used either prevent the nucleation and/or the growth of the gas hydrate particles or modify the hydrate growth in such a way that smaller hydrate particles result.

In addition to the known thermodynamic inhibitors, a large number of monomeric as well as polymeric classes of substances which are kinetic inhibitors or agglomerate inhibitors have been described as gas hydrate inhibitors in the patent literature. Of particular importance here are polymers having a carbon backbone which contain both cyclic (pyrrolidone or caprolactam radicals) and acyclic amide structures in the side groups. Surface-active compounds having both nonionic and cationic structures are also known for use as a gas hydrate inhibitor.

To be able to use gas hydrate inhibitors also with greater supercooling than currently possible, i.e. further within the hydrate region, further increase of the effectiveness compared to the hydrate inhibitors of the prior art is required.

DE-C-199 20 152 describes modified polyglycolethercarboxylic acid-amides as additives for inhibiting gas hydrate formation, which, depending on the structure, exhibit broad activity and prevent both the nucleation and the growth or the agglomeration of gas hydrates. However, the compounds disclosed have poor biodegradability, which prevents their use especially in offshore applications.

It was therefore an object of the present invention to provide improved additives which are completely biodegradable and have a broad application spectrum with high activity potential, both for slowing down the formation of gas hydrates (kinetic inhibitors) and for keeping the gas hydrate agglomerates small and pumpable (anti-agglomerates).

SUMMARY OF THE INVENTION

As has now surprisingly been found, both water-soluble and oil-soluble esters of alkoxylated hydroxycarboxamides are suitable as gas hydrate inhibitors. Depending on the structure, the products can both delay the nucleation and growth of gas hydrates (kinetic gas inhibitors) and suppress the agglomeration of gas hydrates (agglomerate inhibitors). Owing to the hydrolyzable ester function, the products are readily biodegradable.

The invention therefore relates to the use of compounds of the formula (1)

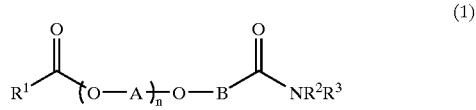

in which
$R^1$ is $C_1$- to $C_{24}$-alkyl, $C_2$- to $C_{24}$-alkyl or a $C_8$- to $C_{18}$-aryl radical which may be substituted by a $C_1$- to $C_{12}$-alkyl group,
$R^2$, $R^3$ independently of one another, are hydrogen, $C_1$- to $C_{18}$-alkyl, or $C_5$- to $C_7$-cycloalkyl, or $R^2$ and $R^3$, including the nitrogen atom to which they are bonded, form a ring of 4 to 8 ring atoms, in which oxygen or nitrogen atoms may also be present in addition to carbon,
A are identical or different $C_2$- to $C_4$-alkylene radicals,
B is $C_1$- to $C_7$-alkylene, and
n is an integer from 1–40,
as gas hydrate inhibitors.

Depending on the type of application described below, $R^1$ is preferably $C_1$- to $C_8$-alkyl or $C_6$- to $C_{24}$-alkyl. $R^2$ and $R^3$ are preferably hydrogen or $C_1$- to $C_8$-alkyl.

A is a $C_2$- to $C_4$-alkylene group or different $C_2$- to $C_4$-alkylene groups. This means that the compounds of the formula (1) can be alkoxylated with up to 40 $C_2$- to $C_4$-alkoxy units, it being possible for said alkoxylation to be a pure ethoxylation, propoxylation or butoxylation or a mixed akoxylation. Preferably, A is an ethylene or propylene group, in particular an ethylene group. In a preferred embodiment, A is an ethylene radical and n is an integer from 1 to 10.

B is a $C_1$–$C_7$-alkylene group which may be either straight-chain or branched and which may be linked at any desired carbon atom by the ether function to the radical of the molecule. Preferably, B is a methylene, ethylene or propylene group, in particular a methylene group. If B is branched, it is preferably linked terminally via the ether function, i.e. the polymethylene group present between the amide and the ether function preferably has more carbon atoms than the alkyl side chains.

The compounds of the formula (1) are obtainable by alkoxylation or hydroxycarboxamides and their subsequent esterification with corresponding carboxylic acids, carboxylic anhydrides or carbonyl chlorides. The hydroxycarboxamides required for the preparation of the compounds according to the invention are obtainable from hydroxycarboxylic acids or from the corresponding lactones by amidation with corresponding amines. Esterification, amidation and alkoxylation are carried out by processes known from the literature.

Examples of suitable carboxylic acids are acetic acid, propionic acid, butyric acid, valeric acid, isovaleric acid, hexanoic acid, 2-ethylhexanoic acid, nonanoic acid, isononanoic acid, decanoic acid, isodecanoic acid, dodecanoic acid, tetradecanoic acid, hexadecanoic acid, octadecanoic acid, oleic acid, their anhydrides or acid chlorides and synthetic or natural fatty acid cuts.

Expediently used hydroxycarboxylic acids or lactones are glycolic acid, lactic acid, 2-hydroxyisobutyric acid, 2-hydroxyisocaproic acid, propiolactone, butyrolactone and caprolactone.

Suitable amines for the amidation of the hydroxycarboxylic acids or of the corresponding lactones are amines having 1 to 7 carbon atoms, such as methylamine, ethylamine, propylamine, n-butylamine, isobutylamine, sec-butylamine, pentylamine, hexylamine, dimethylamine, diethylamine, dipropylamine, dibutylamine, diisopropylamine, cyclopentylamine, cyclohexylamine, pyrrolidine, piperidine or morpholine. Amides having $C_3$–$C_5$-alkyl radicals or cyclic amines having 5 to 7 ring members are particularly suitable. Diethylamine, isopropylamine, isobutylamine, isopentylamine, cyclopentylamine, piperidine and pyrrolidine are particularly preferred. The amidation can be carried out with or without the use of catalysts at reaction temperatures of from 80 to 200° C., preferably from 100 to 180° C.

Depending on the structure according to formula (1), the properties of the compounds can be modified in such a way that they can inhibit the gas hydrate formation in a controlled manner, according to the given conditions, as specific additives.

A short alkyl radical $R^1$ (about $C_1$ to $C_8$) or a high ethylene oxide content gives water-soluble products which suppress the nucleation of the gas hydrates and act as kinetic ihibitors or, as synergistic components, are capable of reinforcing the effect of other kinetic inhibitors, as shown in the attached examples. Water-soluble here means those substances of which at least 5 g give a clear solution in 1 l of water.

A longer alkyl radical $R^1$ (about $C_8$ to $C_{24}$) or lower contents of ethylene oxide gives more hydrophobic/lipophilic, conditionally oil-soluble compounds having surfactant character which wet the surface of gas hydrate particles with oil and hence prevent the agglomeration of the hydrates. They thus act as agglomerate inhibitors. The agglomerate inhibitors are in general at least partly soluble in the condensate phase of the multiphase mixture. Conditionally oil-soluble here means substances of which at least 1 g gives a clear solution in solvent naphtha.

Suitable alcoholic solvents for the compounds according to the invention are water-soluble monoalcohols, such as, for example, propanols, butanols and oxyethylated monoalcohols, such as butylglycol, isobutylglycol, butyldiglycol and polyglycols. Clear solutions generally form.

The compounds can be used alone or in combination with other known gas hydrate inhibitors. In general, the gas hydrate inhibitor according to the invention is added to the system tending to hydrate formation in an amount such that adequate inhibition is obtained under the given pressure and temperature conditions. The gas hydrate inhibitors according to the invention are generally used in amounts from 0.01 to 2% by weight (based on the weight of the aqueous phase), corresponding to 100 to 20,000 ppm, preferably from 0.02 to 1% by weight. If the gas hydrate inhibitors according to the invention are used as a mixture with other gas hydrate inhibitors, the concentration of the mixture is from 0.01 to 2 or 0.02 to 1% by weight in the aqueous phase.

Furthermore, mixtures of the compounds according to formula (1) with one or more polymers having a carbon backbone obtained by polymerization and amide bonds in the side chains are particularly suitable as gas hydrate inhibitors and hence a preferred embodiment of this invention. These include in particular polymers such as polyvinylpyrrolidone, polyvinylcaprolactam, polyisopropylacrylamide, polyacryloylpyrrolidine, copolymers of vinylpyrrolidone and vinylcaprolactam, copolymers of vinylcaprolactam and N-methyl-N-vinylacetamide and terpolymers of vinylpyrrolidone, vinylcaprolactam and further anionic, cationic and neutral comonomers having a vinylic double bond, such as 2-dimethylamino-methacrylate, 1-olefins, N-alkylacrylamides, N-vinylacetamide, acrylamide, sodium 2-acrylamido-2-methyl-1-propanesulfonate (AMPS) or acrylic acid. Furthermore, mixtures with homo- and copolymers of N,N-dialkylacrylamides, such as N-acryloylpyrrolidine, N-acryloylmorpholine and N-acryloylpiperidine or N-alkylacrylamides such as isopropylacrylamide and homo- and copolymers of alkoxyalkyl-substituted (meth)acrylic esters are also suitable. Mixtures with alkylpolyglycosides, hydroxyethylcellulose, carboxymethylcellulose and other ionic or nonionic surfactant molecules are also suitable.

In a preferred embodiment of the invention, the gas hydrate inhibitors according to the invention are used as a mixture with polymers which are disclosed in WO-A-96/08672. These polymers are those which have structural units of the formula

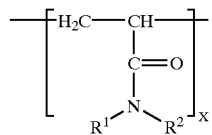

in which $R^1$ is a hydrocarbon group having 1 to 10 carbon atoms and 0 to 4 heteroatoms, selected from N, O and S, $R^2$ is a hydrocarbon group having the same definition as $R^1$, and X is the average number of the repeating units, the latter being such that the polymer has a molecular weight of from 1000 to 6 000 000. For use within the scope of the present invention, polyisopropylacrylamides and polyacryloylpyrrolidines are particularly suitable.

In a further preferred embodiment of the invention, the gas hydrate inhibitors according to the invention are used as a mixture with polymers which are disclosed in WO-A-96/41785. This document discloses gas hydrate inhibitors comprising structural units of the formula

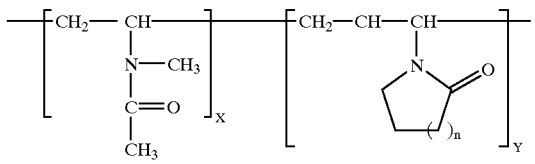

in which n is a number from 1 to 3 and x and y are the number of repetitive units, which are such that the molecular weight of the polymers is from 1000 to 6 000 000. For use within the scope of the present invention, copolymers of N-vinylcaprolactam and N-vinyl-N-methylacetamide or vinylpyrrolidone are particularly suitable.

In a further preferred embodiment of the invention, the gas hydrate inhibitors according to the invention are used as a mixture with other polymers which are disclosed in WO-A-94/12761. The document discloses additives for preventing the formation of gas hydrates, which contain polymers comprising cyclic substituents having from 5 to 7 ring members. For use within the scope of the present invention, polyvinylcaprolactam, polyvinylpyrrolidone and hydroxyethylcellulose are particularly suitable.

Also particularly suitable are mixtures of the polymers according to the invention with maleic anhydride-based gas hydrate inhibitors, as described in WO-A-97/6506, in particular maleic anhydride copolymers reacted with mono- and/or diamines. Among these, especially modified vinyl acetate/ maleic anhydride copolymers are particularly preferred.

In a further preferred embodiment of the invention, the gas hydrate inhibitors according to the invention are used as a mixture with other polymers, containing from 1 to 100 mol % of structural units of the formula

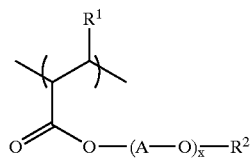

in which
$R^1$ is hydrogen or $C_1$–$C_6$-alkyl
$R^2$ is $C_1$–$C_{24}$-alkyl, $C_2$–$C_{24}$-alkylene or a $C_6$–$C_{18}$-aryl radical which may be substituted by a $C_1$–$C_{12}$-alkyl group,
A are identical or different $C_2$–$C_4$-alkylene radicals and
x is an integer from 2–40,
in amounts of from 0.01 to 2% by weight, based on the aqueous phase.

If mixtures are used, the concentration ratios of the gas hydrate inhibitors according to the invention to the admixed components are from 90:10 to 10:90 percent by weight, and mixtures in the ratios of from 75:25 to 25:75, and in particular from 60:40 to 40:60, are preferably to be used.

In petroleum and natural gas production or in the preparation of drilling fluids, the compounds, as well as their mixtures with other gas hydrate inhibitors, can be added to the multiphase mixture susceptible to hydrate formation by means of conventional equipment, such as injection pumps or the like; owing to the good solubility of the polymers according to the invention, the inhibitor is rapidly and uniformly distributed in the aqueous phase tending to hydrate formation or in the condensate phase.

Since the inhibitors primarily delay the formation and the growth of hydrate nuclei or prevent agglomeration, the inhibitor is preferably added before gas hydrate formation occurs, i.e. at above the equilibrium temperature of the hydrate formation. This is the case, for example, if the inhibitor is added, for example, directly at the natural gas source or at the beginning of the pipeline in which inhibition is to be effected.

EXAMPLES

To investigate the inhibitory effect of the polymers, a stirred steel autoclave with temperature control, pressure sensor and torque transducer and an internal volume of 450 ml was used and was filled with distilled water and gas in a volume ratio of 20:80. Condensate was additionally added for investigations of agglomerate inhibition. 90 bar natural gas was then forced in.

Starting from an initial temperature of 17.5° C., cooling was effected to 2° C. in the course of 2 h, followed by stirring for 18 h at 2° C. and further heating to 17.5° C. in the course of 2 h. First, a decrease in pressure according to the thermal expansion of the gas is observed. If the formation of gas hydrate nuclei occurs during the supercooling time, the measured pressure decreases, an increase in the measured torque and slight rise in temperature being observed. Without an inhibitor, further growth and increased agglomeration of this hydrate nuclei rapidly lead to a further increase in the torque. On heating of the mixture, the gas hydrates decompose so that the initial state of the experimental series is reached.

The time from when the minimum temperature of 2° C. is reached to the initial gas absorption ($T_{ind}$) is used as a measure of the inhibitory effect of the additive. Long induction times indicate a kinetic inhibitor effect. The pressure drop and temperature rise reflect the amount of hydrate crystals formed On the other hand, the torque measured in the autoclave serves as a parameter for the agglomeration of the hydrate crystals. In the case of a good anti-agglomerate, the torque established after the formation of gas hydrates is substantially reduced compared with the blank value. Ideally, snow-like, fine hydrate crystals form in the condensate phase and do not agglomerate and thus do not block the installations serving for gas transport and for conveying gas.

Below, first the preparation of the additive components according to the invention and then their activity as gas hydrate inhibitor are described.

Example 1

885 g of glycol acid (70%) and 1021 g of isobutylamine were initially introduced into a 2 l autoclave and heated for 6 h at 200° C. The water of reaction/amine mixture formed was then distilled off at 140° C. in vacuo.

Example 2

172 g of γ-butyrolactone were initially introduced into a 500 ml four-necked flask and 146 g of isobutylamine was slowly metered in. Heating was then gradually carried out to 80–150° C. so that the batch refluxed. The reaction mixture was stirred at 150° C. until reflux was no longer observable (about 2 h).

Example 3

172 g of γ-butyrolactone were initially introduced into a 500 ml four-necked flask and 170 g of cyclopentylamine was slowly metered in. Heating was then gradually carried out to 80–150° C. so that the batch refluxed. The reaction mixture was stirred at 150° C. until reflux was no longer observable (about 2 h).

Example 4

172 g of γ-butyrolactone were initially introduced into a 500 ml four-necked flask and 198 g of cyclohexylamine was slowly metered in. Heating was then gradually carried out to 80–150° C. so that the batch refluxed. The reaction mixture was stirred at 150° C. until reflux was no longer observable (about 2 h).

Example 5

172 g of ε-caprolactone were initially introduced into a 500 ml four-necked flask and 146 g of isobutylamine was slowly metered in. Heating was then gradually carried out to 80–150° C. so that the batch refluxed. The reaction mixture was stirred at 150° C. until reflux was no longer observable (about 4 h).

Example 6

21 656 g of isobutylglycolamide were initially introduced into a 2 l autoclave and were gassed with the corresponding amount of EO under alkali catalysis at 150° C. up to a maximum of 4 bar. The reaction was continued for 1 hour at 4.5 bar nitrogen pressure.

Example 7

49.2 g of isobutylglycolamide triethoxylate and 20.4 g of acetic anhydride were initially introduced into a 100 ml four-necked flask and heated for 5 h while flushing with nitrogen and refluxing. The acetic acid formed was then distilled off in vacuo (4 mbar).

Example 8

49.2 g of isobutylglycolamide triethoxylate and 26 g of propionic anhydride were initially introduced into a 100 ml four-necked flask and heated for 5 h while flushing with nitrogen and refluxing. The propionic acid formed was then distilled off in vacuo (4 mbar).

Example 9

49.2 g of isobutylglycolamide triethoxylate and 25 g of propionic acid (excess) in 50 g of Shellsol® 100/140 (mainly aliphatic solvent mixtures having various boiling ranges) were initially introduced into a 250 ml four-necked flask. 0.1 g of p-toluenesulfonic acid was added and the reaction mixture was refluxed for 2 h. The water of reaction formed was then completely removed and the solvent and unconverted propionic acid were distilled off in vacuo (4 mbar).

Example 10

50.4 g of isobutylglycolamide pentaethoxylate and 25 g of propionic acid (excess) in 50 g of Shellsol 100/140 were initially introduced into a 250 ml four-necked flask. g of p-toluenesulfonic acid was added and the reaction mixture was refluxed for h. The water of reaction formed was then completely removed and the solvent and unconverted propionic acid were distilled off in vacuo (4 mbar).

Example 11

49.2 g of isobutylglycolamide triethoxylate and 43.2 g of 2-ethylhexanoic acid were initially introduced into a 100 ml four-necked flask and, after addition of 0.5 g of FASCAT, were heated for 2 h while flushing with nitrogen and refluxing. The water of reaction formed was then distilled off continuously.

Example 12

49.2 g of isobutylglycolamide triethoxylate and 84.6 g of oleic acid were initially introduced into a 100 ml four-necked flask and, after addition of 0.5 g of FASCAT, were heated for 2 h while flushing with nitrogen and refluxing. The water of reaction formed was then distilled off continuously.

Example 13

50.4 g of isobutylglycolamide pentaethoxylate and 20.4 g of acetic anhydride were initially introduced into a 100 ml four-necked flask and were heated for 5 h while flushing with nitrogen and refluxing. The acetic acid formed was then distilled off in vacuo (4 mbar).

Example 14

50.4 g of isobutylglycolamide pentaethoxylate and 26.0 g of propionic anhydride were initially introduced into a 100 ml four-necked flask and were heated for 5 h while flushing with nitrogen and refluxing. The propionic acid formed was then distilled off in vacuo (4 mbar).

Example 15

50.4 g of isobutylglycolamide pentaethoxylate and 43.2 g of 2-ethyl-hexanoic acid were initially introduced into a 100 ml four-necked flask and, after addition of 0.5 g of FASCAT, were heated for 2 h while flushing with nitrogen and refluxing. The water of reaction formed was then distilled off continuously.

Example 16

50.4 g of isobutylglycolamide pentaethoxylate and 84.6 g of oleic acid were initially introduced into a 100 ml four-necked flask and, after addition of 0.5 g of FASCAT, were heated for 2 h while flushing with nitrogen and refluxing. The water of reaction formed was then distilled off continuously.

Example 17

60.1 g of isobutylhydroxybutyramide triethoxylate and 20.4 g of acetic anhydride were initially introduced into a 100 ml four-necked flask and were heated for 5 h while flushing with nitrogen and refluxing. The acetic acid formed was then distilled off in vacuo (4 mbar).

Example 18

63.5 g of cyclohydroxybutyramide triethoxylate and 20.4 g of acetic anhydride were initially introduced into a 100 ml four-necked flask and were heated for 5 h while flushing with nitrogen and refluxing. The acetic acid formed was then distilled off in vacuo (4 mbar).

Example 19

In a 250 ml beaker, 50 g of additive according to example 11 were formulated with 50 g of polyvinylcaprolactone (comparison) in 100 g of butylglycol.

Example 20

In a 250 ml beaker, 50 g of additive according to example 18 were formulated with 50 g of polyvinylcaprolactone (comparison) in 100 g of butylglycol.

Test Results

TABLE 1

Composition and properties of the natural gases used

|  | Gas 1 | Gas 2 |
|---|---|---|
| Methane | 79.3 | 92.1 |
| Ethane | 10.8 | 3.5 |
| Propane | 4.8 | 0.8 |
| Butane | 1.9 | 0.7 |
| Carbon dioxide | 1.4 | 0.6 |
| Nitrogen | 1.8 | 2.3 |
| $T_1$ | 12° C. | 7° C. |
| $T_2$ | 18° C. | 12° C. |

$T_1$ and $T_2$ are the supercoolings below the equilibrium temperature of the hydrate formation at 50 and 100 bar.

A solution of polyvinylcaprolactam (PVCap), molecular weight 5000 g/mol, in butylglycol was used as a comparison substance.

The additives were used in a concentration of 5000 ppm.

TABLE 2

Activity of the additives as gas hydrate inhibitors

| Example No. | Additive according to Example No. | Gas | Pressure p (bar) | $T_{ind}$ | Pressure drop Δ p (bar) | Temperature increase Δ T (K) |
|---|---|---|---|---|---|---|
| 21(V) | none | 1 | 50 | 0 | >40 | >1.5 |
| 22(V) | none | 2 | 100 | 0 | >40 | >1.5 |
| 23 | 7 | 1 | 50 | <5 min | 27.0 | 0.3 |
| 24 | 7 | 2 | 100 | <5 min | 22.0 | 0.25 |
| 25 | 8 | 1 | 50 | <5 min | 17.4 | 0.2 |
| 26 | 8 | 2 | 50 | <5 min | 0.8 | 0 |
| 27 | 8 | 2 | 100 | <5 min | 7.1 | 0.1 |
| 28 | 11 | 1 | 50 | 120 min | 0.1 | 0 |
| 29 | 11 | 2 | 100 | <5 min | 4.0 | 0.1 |
| 30 | 13 | 1 | 50 | <5 min | 20.1 | 0.2 |
| 31 | 14 | 1 | 50 | <5 min | 23.0 | 0.25 |
| 32 | 17 | 1 | 50 | 20 min | 5.8 | 0.1 |
| 33 | 17 | 2 | 100 | 30 min | 10.8 | 0.2 |
| 34 | 18 | 1 | 50 | <5 min | 13.1 | 0.3 |
| 35 | 19 | 1 | 50 | 70 min | 4.3 | 0.1 |
| 36 | 20 | 1 | 50 | 40 min | 5.4 | 0.1 |
| 37(V) | PVCap | 1 | 50 | <5 min | 10.0 | 0.4 |
| 38(V) | PVCap | 2 | 100 | <5 min | 6.0 | 0.1 |

As is evident from the above test results, the products according to the invention are especially those having short alkyl radicals $R^1$ and a high degree of ethoxylation relative to the alkyl radical, act as kinetic hydrate inhibitors and exhibit a substantial improvement compared with the prior art. They can also be used for increasing (synergistic effect) the efficiency of inhibitors of the prior art.

To test the effect as agglomerate inhibitors, water and mineral spirit were initially introduced into the test autoclave used above (20% of the volume in a ratio of 1:2) and 5000 ppm, based on the aqueous phase, of the respective additive were added.

At an autoclave pressure of 90 bar and using gas 1 and a stirring speed 5000 rpm, cooling was effected from an initial temperature of 17.5° C. to 2° C. in the course of 2 hours, stirring was then carried out for 25 hours at 2° C. and heating was effected again. The pressure drop due to the hydrate formation and the resultant torque at the stirrer, which is a measure of the agglomeration of the gas hydrates, were measured.

TABLE 3

Resultant torques

| Example No. | Additive according to Example No. | Pressure drop Δ p (bar) | Temperature increase Δ T (K) | Torque $M_{max}$ (Ncm) |
|---|---|---|---|---|
| 39(V) | none | >40 | >8.0 | 15.9 |
| 40 | 11 | 13.4 | 0.2 | 0.3 |
| 41 | 12 | 22.1 | 2.5 | 1.2 |
| 42 | 15 | 25.3 | 5.3 | 8.8 |
| 43 | 16 | 16.8 | 0.8 | 0.9 |
| 44(V) | TBAB | 21.5 | 1.0 | 1.5 |
| 45(V) | TBAB | 15.0 | 1.0 | 1.2 |

Two commercially available antiagglomerant inhibitors based on tetrabutylammonium bromide (TBAB) were used as comparative substances.

As is evident from the examples, the measured torques were greatly reduced compared with the blank value, in spite of considerable hydrate formation. This indicates a substantial agglomerate-inhibiting effect of the products according to the invention.

What is claimed is:

1. A process for inhibiting hydrate formation in a gas comprising admixing the gas with a compound of the formula (1)

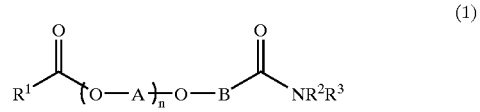

wherein $R^1$ is $C_1$- to $C_{24}$-alkyl, $C_2$- to $C_{24}$-alkenyl or a C8- to $C_{18}$-aryl radical which may be substituted by a $C_1$- to $C_{12}$-alkyl group, $R^2$, $R^3$ independently of one another, are hydrogen, $C_1$- to $C_{18}$-alkyl, or $C_5$- to $C_7$-cycloalkyl, or $R^2$ and $R^3$, including the nitrogen atom to which they are bonded, form a ring of 4 to 8 ring atoms, in which oxygen or nitrogen atoms may also be present in addition to carbon, A are identical or different $C_2$- to $C_4$-alkylene radicals, B is $C_1$- to $C_7$-alkylene, and n is an integer from 1 to 40.

2. The process of claim 1, wherein $R^1$ is $C_1$- to $C_8$-alkyl.

3. The process of claim 1, wherein $R^1$ is $C_8$- to $C_{24}$-alkyl.

4. The process of claim 1, wherein $R^2$ and $R^3$, independently of one another, are hydrogen or $C_1$- to $C_4$-alkyl.

5. The process of claim 1, wherein A is an ethylene radical.

6. The process of claim 1, wherein B is selected from the group consisting of methylene, ethylene, propylene and mixtures thereof.

7. The process of claim 1, wherein n is a number from 2 to 10.

8. An additive for inhibiting gas hydrate formation comprising a compound of the formula (1)

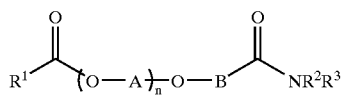

wherein $R^1$ is $C_1$- to $C_{24}$-alkyl, $C_2$- to $C_{24}$-alkenyl or a $C_8$- to $C_{18}$-aryl radical which may be substituted by a $C_1$- to $C_{12}$-alkyl group, $R^2$, $R^3$ independently of one another, are hydrogen, $C_1$- to $C_{18}$-alkyl, or $C_5$- to $C_7$-cycloalkyl, or $R^2$ and $R^3$, including the nitrogen atom to which they are bonded, form a ring of 4 to 8 ring atoms, in which oxygen or nitrogen atoms may also be present in addition to carbon, A are identical or different $C_2$- to $C_4$-alkylene radicals, B is $C_1$- to $C_7$-alkylene, and n is an integer from 1 to 40.

9. An additive for inhibiting gas hydrate formation as claimed in claim 8, comprising a compound of the formula (1)

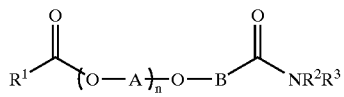

in which $R^1$ is $C_1$- to $C_{24}$-alkyl, $C_2$- to $C_{24}$-alkenyl or a $C_8$- to $C_{18}$-aryl radical which may be substituted by a $C_1$- to $C_{12}$-alkyl group, $R^2$, $R^3$ independently of one another, are hydrogen, $C_1$- to $C_{18}$-alkyl, or $C_5$- to $C_7$-cycloalkyl, or $R^2$ and $R^3$, including the nitrogen atom to which they are bonded, form a ring of 4 to 8 ring atoms, in which oxygen or nitrogen atoms may also be present in addition to carbon, A are identical or different $C_2$- to $C_4$-alkylene radicals, B is $C_1$- to $C_7$-alkylene, and n is an integer from 1 to 40, and at least one water-soluble polymer selected from the group consisting of polyisopropylacrylamide, polyacryloylpyrrolidine, polyvinylcaprolactam, polyvinylpyrrolidone, copolymers of vinylcaprolactam with vinylpyrrolidone, N-vinyl-N-methylacetamide, alkoxyalkyl-substituted (meth) acrylic esters, and copolymers which contain structural units of maleic acid or its anhydride or amide derivatives.

\* \* \* \* \*